(12) United States Patent
Sugahara

(10) Patent No.: US 10,661,491 B2
(45) Date of Patent: May 26, 2020

(54) MACHINE BASE

(71) Applicant: FANUC CORPORATION, Yamanashi (JP)

(72) Inventor: Keisuke Sugahara, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/021,594

(22) Filed: Jun. 28, 2018

(65) Prior Publication Data

US 2019/0009442 A1    Jan. 10, 2019

(30) Foreign Application Priority Data

Jul. 4, 2017    (JP) ................................. 2017-130753

(51) Int. Cl.
| | |
|---|---|
| *B29C 45/17* | (2006.01) |
| *B29C 45/83* | (2006.01) |
| *F01M 11/00* | (2006.01) |
| *B29C 45/64* | (2006.01) |
| *F16M 1/00* | (2006.01) |
| *F16M 9/00* | (2006.01) |

(52) U.S. Cl.
CPC .. *B29C 45/1761* (2013.01); *B29C 2045/1765* (2013.01); *F16M 1/00* (2013.01); *F16M 9/00* (2013.01)

(58) Field of Classification Search
CPC .. B29C 45/1761; B29C 45/1765; F16M 1/00; F16M 9/00
See application file for complete search history.

(56) References Cited

U.S. PATENT DOCUMENTS

| | | | | |
|---|---|---|---|---|
| 2,209,807 | A | * | 7/1940 | Belsky .................. A21C 11/10 210/248 |
| 2019/0009442 | A1 | * | 1/2019 | Sugahara ............ B29C 45/1761 |

FOREIGN PATENT DOCUMENTS

| | | |
|---|---|---|
| CN | 201664983 U | 12/2010 |
| CN | 202826239 U | 3/2013 |
| CN | 204249281 U | 4/2015 |
| CN | 204431672 U | 7/2015 |
| CN | 204585704 U | 8/2015 |

(Continued)

OTHER PUBLICATIONS

Notification of Reasons for Refusal issued by the Japanese Patent Office in relation to Japanese Application No. 2017-130753 dated Feb. 5, 2019 (2 pages) along with an English language translation (2 pages).

(Continued)

*Primary Examiner* — Tan Le

(74) *Attorney, Agent, or Firm* — Robert P. Michal, Esq.; Carter, DeLuca & Farrell LLP

(57) ABSTRACT

A machine base supports at least one of a clamping unit and an injection unit of an injection molding machine from below. The machine base includes an upper frame extended horizontally and configured to support at least one of the clamping unit and the injection unit. The upper frame has a hollow member and a plate member having a concave cross-section, attached to an upper surface of the hollow member. The plate member and the hollow member are formed with a through hole penetrating from an upper surface of the plate member to a hollow portion in the hollow member.

11 Claims, 8 Drawing Sheets

(56) References Cited

FOREIGN PATENT DOCUMENTS

| | | | |
|---|---|---|---|
| CN | 205767170 U | | 12/2016 |
| CN | 205800023 U | | 12/2016 |
| CN | 205889803 U | | 1/2017 |
| DE | 102018115708 A1 | * | 6/2018 |
| JP | 2002113755 A | | 4/2002 |
| JP | 2007-182029 A | | 1/2006 |
| JP | 2007-182029 A | | 7/2007 |
| JP | 2010234433 A | | 10/2010 |
| JP | 2015039820 A | | 3/2015 |
| KR | 20100060074 A | * | 6/2010 |
| KR | 20170052882 A | | 5/2017 |

OTHER PUBLICATIONS

Decision to Grant a Patent issued by the Japanese Patent Office in relation to Japanese Application No. 2017-130753 dated Mar. 19, 2019 (3 pages) along with an English language translation (3 pages).
Office Action including Search Report issued by the State Intellectual Property Office of the People's Republic of China in relation to Chinese Application No. 201810716215.1 dated Jun. 13, 2019 (8 pages).

* cited by examiner

MACHINE BASE

CROSS-REFERENCE TO RELATED APPLICATION

This application is based upon and claims the benefit of priority from Japanese Patent Application No. 2017-130753 filed on Jul. 4, 2017, the contents of which are incorporated herein by reference.

BACKGROUND OF THE INVENTION

Field of the Invention

The present invention relates to a machine base for supporting at least one of a clamping unit and an injection unit of an injection molding machine from below.

Description of the Related Art

Japanese Laid-Open Patent Publication No. 2007-182029 discloses collection of lubrication oil into a waste grease container by scraping the lubrication oil dropped from the toggle mechanism of an injection molding machine with a scraper that moves together with an operation of opening and closing a mold.

SUMMARY OF THE INVENTION

Typically, the clamping unit and the injection unit of the injection molding machine are installed on a machine base via a slide mechanism such as a guide rail or a slide plate. For this reason, oil such as grease is periodically supplied to the slide mechanism. This supplied oil flows along the members constituting the machine base and falls inside or outside the machine base. At this time, there is no problem with the oil falling to the place where the oil pan is installed, but falling of the oil to the place where no oil pan is installed is environmentally unfavorable. There is no solution to this problem in Japanese Laid-Open Patent Publication No. 2007-182029.

It is therefore an object of the present invention to provide a machine base capable of leading oil that flows through a machine base to a manageable site.

An aspect of the present invention resides in a machine base for supporting at least one of a clamping unit and an injection unit of an injection molding machine, from below, comprising: an upper frame extended horizontally and configured to support at least one of the clamping unit and the injection unit, wherein the upper frame has a hollow member and a plate member having a concave cross-section, attached to an upper surface of the hollow member, and wherein the plate member and the hollow member are formed with a first through hole penetrating from an upper surface of the plate member to a hollow portion in the hollow member.

According to the present invention, it is possible with a simple structure to flow oil having flowed to the upper frame to a manageable place. Further, by providing the plate member having a concave cross-section on the upper frame, it is possible to prevent the oil from dropping from the upper frame and dripping on the installation surface on which the injection molding machine is installed.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The machine bases of the present invention will be detailed by describing preferred embodiments with reference to the accompanying drawings.

First Embodiment

Figure 1:
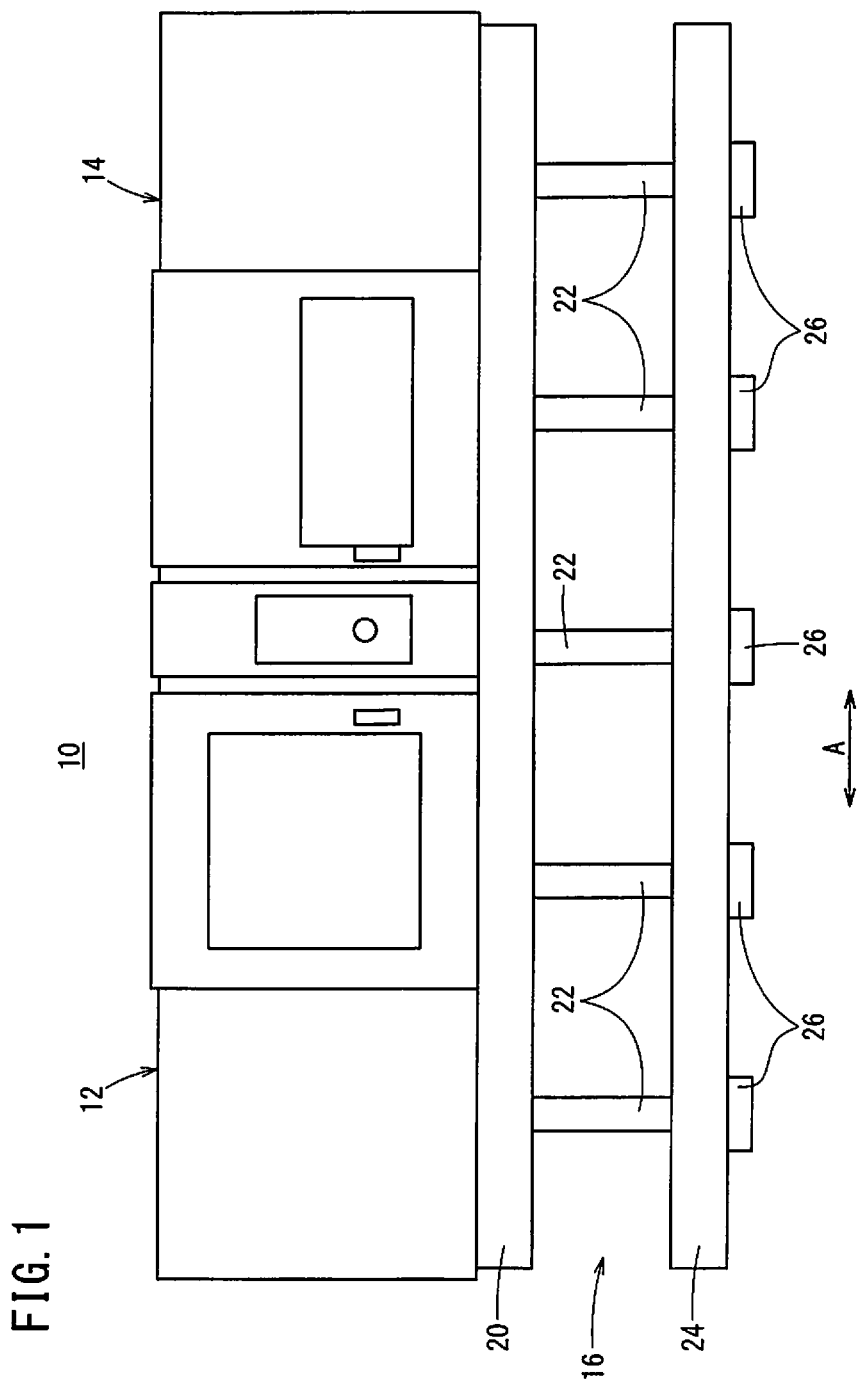
FIG. 1 is an overall external configuration diagram of an injection molding machine.

FIG. 1 is an overall external configuration diagram of an injection molding machine 10. The injection molding machine 10 includes a clamping unit 12, an injection unit 14 and a machine base 16 supporting the clamping unit 12 and the injection unit 14 from below. The clamping unit 12 has an unillustrated mold and opens and closes the mold by generation and release of mold clamping force. The injection unit 14 injects molten resin into the cavity formed by the mold. The clamping unit 12 and the injection unit 14 are disposed to face each other along the opening/closing direction (direction A) of the mold.

The machine base 16 includes: an upper frame 20 horizontally extended in the direction A with the clamping unit 12 and the injection unit 14 placed thereon; a plurality of uprights 22 that support the upper frame 20 from below and extend downward; a lower frame 24 which is provided below the upper frame 20 and supports the multiple uprights 22 and horizontally extends in the direction A; and a plurality of support members 26 supporting the lower frame 24 at the bottom. The support member 26 is placed on the installation surface of the injection molding machine 10.

Here, the clamping unit 12 and the injection unit 14 are mounted on the upper frame 20 of the machine base 16 via an unillustrated slide mechanism. At least part of the mechanisms of the clamping unit 12 and the injection unit 14 can be moved on the machine base 16 by means of this slide mechanism. Oil as a lubricant is supplied to this slide mechanism.

Figure 2:
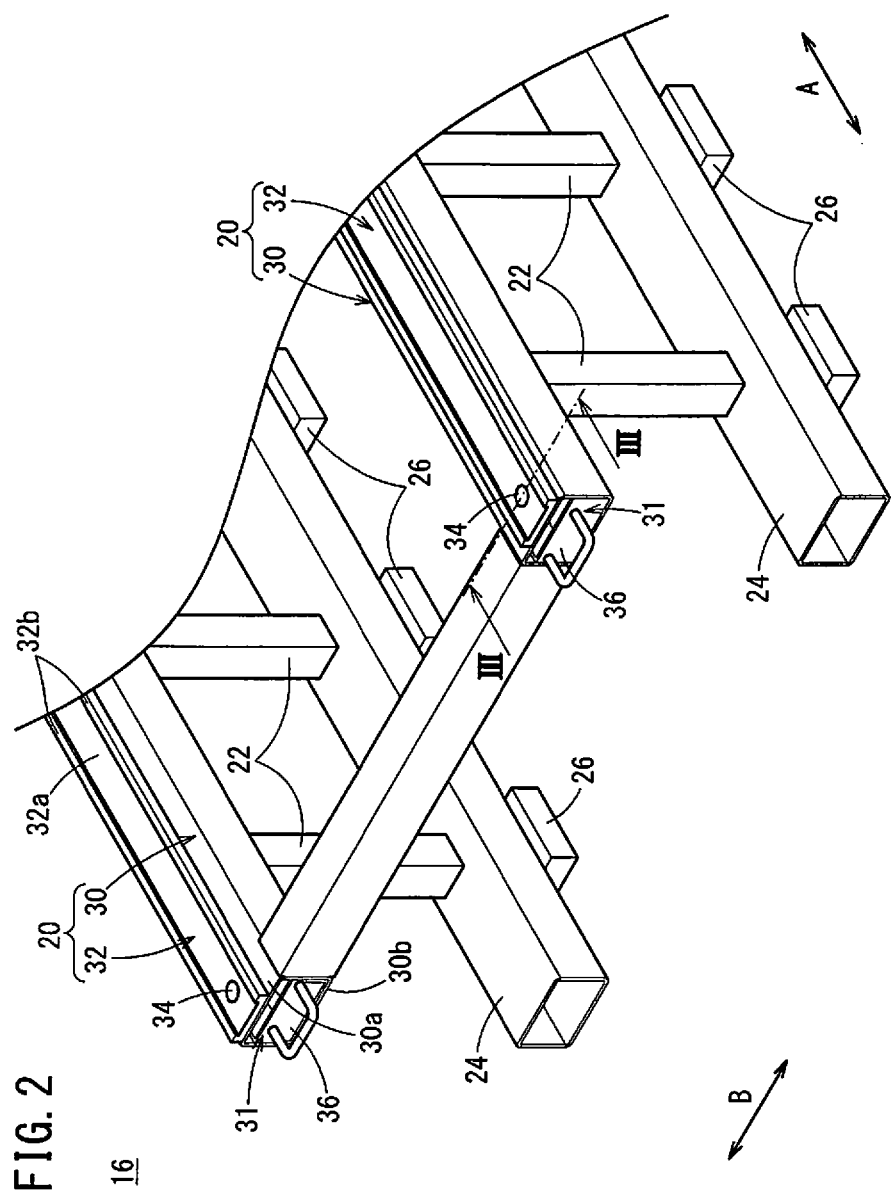
FIG. 2 is an enlarged view of main parts of a machine base shown in FIG. 1.
Figure 3:
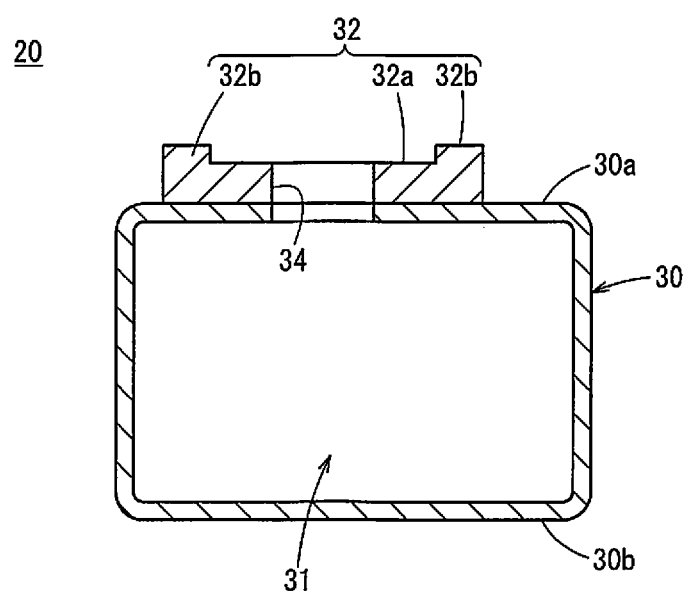
FIG. 3 is a sectional view taken along a line III-III of FIG. 2.

FIG. 2 is an enlarged view of main parts of the machine base 16, and FIG. 3 is a sectional view taken along a line III-III in FIG. 2. FIG. 3 is a sectional view of the upper frame 20 across the direction B (the width direction of the machine base 16) perpendicular to the longitudinal direction (the direction A) of the upper frame 20. The two upper frames 20 and the two lower frames 24 are provided with a predetermined distance spaced from each other with respect to the B direction.

The upper frame 20 has a hollow member (for example, a pipe) 30 and a plate member 32 attached to the upper surface of the hollow member 30. The hollow member 30 and the plate member 32 extend horizontally in the direction A. The plate member 32 has a concave cross-section. Specifically, the plate member 32 is composed of a flat plate part 32a and a pair of raised parts 32b protruding upward along both sides of the flat plate part 32a with respect to the B direction (see FIG. 3). The clamping unit 12 and the injection unit 14 are placed on the plate member 32 via the aforementioned slide mechanism.

In the plate member 32 and the hollow member 30, a through hole (first through hole) 34 is formed penetrating from the upper surface of the plate member 32 to a hollow portion 31 of the hollow member 30. The through hole 34 is formed in the flat plate part 32a of the plate member 32 and an upper wall, designated at 30a, of the hollow member 30. The through hole 34 is preferably formed at one end of the upper frame 20 (the hollow member 30 and the plate member 32) with respect to the direction A.

The supplied oil (grease, etc.) flows to the plate member 32. Since the plate member 32 has a concave cross-section, the oil reaching the plate member 32 flows over the plate member 32 in the direction A and drops at the through hole 34 into the hollow portion 31 of the hollow member 30.

Arranged in the hollow portion 31 of the hollow member 30 is an oil receptacle (first oil receptacle) 36 for receiving and collecting the oil having flowed through the through hole 34. The oil receptacle 36 is provided under (preferably immediately below) the through hole 34. Thereby, the supplied oil can be stored in the oil receptacle 36. Further, by taking out the oil receptacle 36 from the hollow portion 31 of the hollow member 30, it is possible to easily dispose of the collected oil. Provision of the through hole 34 in the end of the upper frame 20 with respect to the direction A makes it easy to take out the oil receptacle 36 and hence simplifies removal of oil.

In this way, it is possible with a simple structure to lead the oil flowing to the upper frame 20 to the manageable place. Further, by providing the plate member 32 having a concave cross-section for the upper frame 20, it is possible to prevent the oil from dropping from the upper frame 20 and dripping to the installation surface on which the injection molding machine 10 is installed.

In the first embodiment, the hollow member 30 has the hollow portion 31 in the entire region in the direction in which the hollow member 30 extends, but the hollow portion 31 may be formed only in the part where the through hole 34 is formed. In this case, when the hollow portion 31 is confined, the hollow member 30 is formed with an opening so that the hollow portion 31 can be accessed from the outside (so that the hollow portion 31 does not become a confined space).

Second Embodiment

Figure 4:
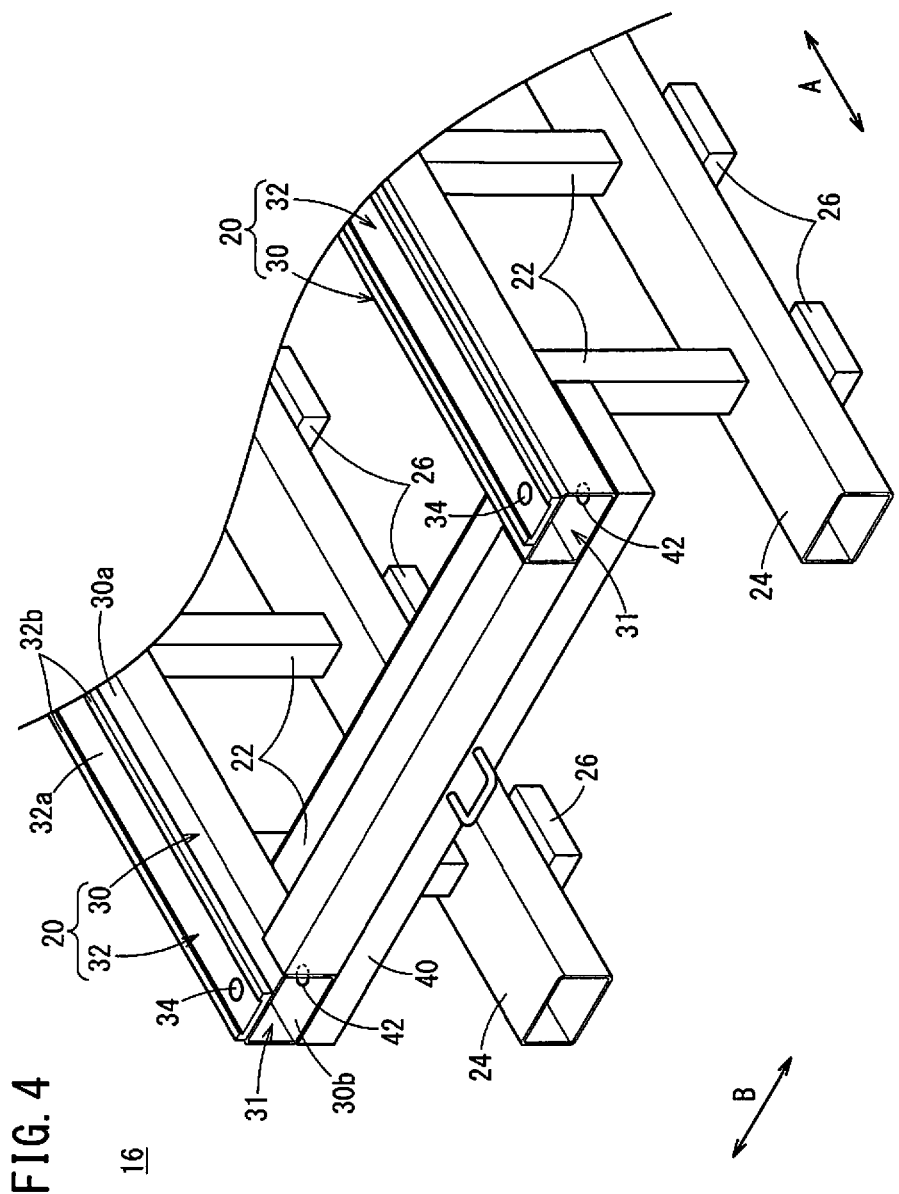
FIG. 4 is an enlarged view of main parts of a machine base in a second embodiment.

FIG. 4 is an enlarged view of main parts of a machine base 16 in the second embodiment. The same reference numerals are given to the same components as those in the above embodiment, and only different points will be described.

The second embodiment is different from the first embodiment in that an oil receptacle (second oil receptacle) 40 is provided below the upper frame 20, instead of arranging the oil receptacle 36 in the hollow portion 31 of the hollow member 30.

In the second embodiment, a through hole (second through hole) 42 is also formed in the bottom wall, designated at 30b, of the hollow member 30. The through hole 42 is preferably formed in the end of the upper frame 20 (the hollow member 30 and the plate member 32) with respect to the direction A. In addition, the through hole 42 is preferably formed under the through hole 34, and more preferably formed directly below the through hole 34.

Arranged under the hollow member 30 is the oil receptacle 40 for receiving and collecting the oil having flowed through the through holes 34, 42. The oil receptacle 40 is provided below (preferably directly below) the through hole 42. As a result, the supplied oil can be stored in the oil receptacle 40. In this way, it is possible with a simple structure to lead the oil flowing to the upper frame 20 to a manageable place.

The oil receptacle 40 is detachably supported by an unillustrated support member. This makes it easy to dispose of collected oil. It is also preferable that the gap between the oil receptacle 40 provided under the hollow member 30 and the hollow member 30 is small.

Third Embodiment

Figure 5:
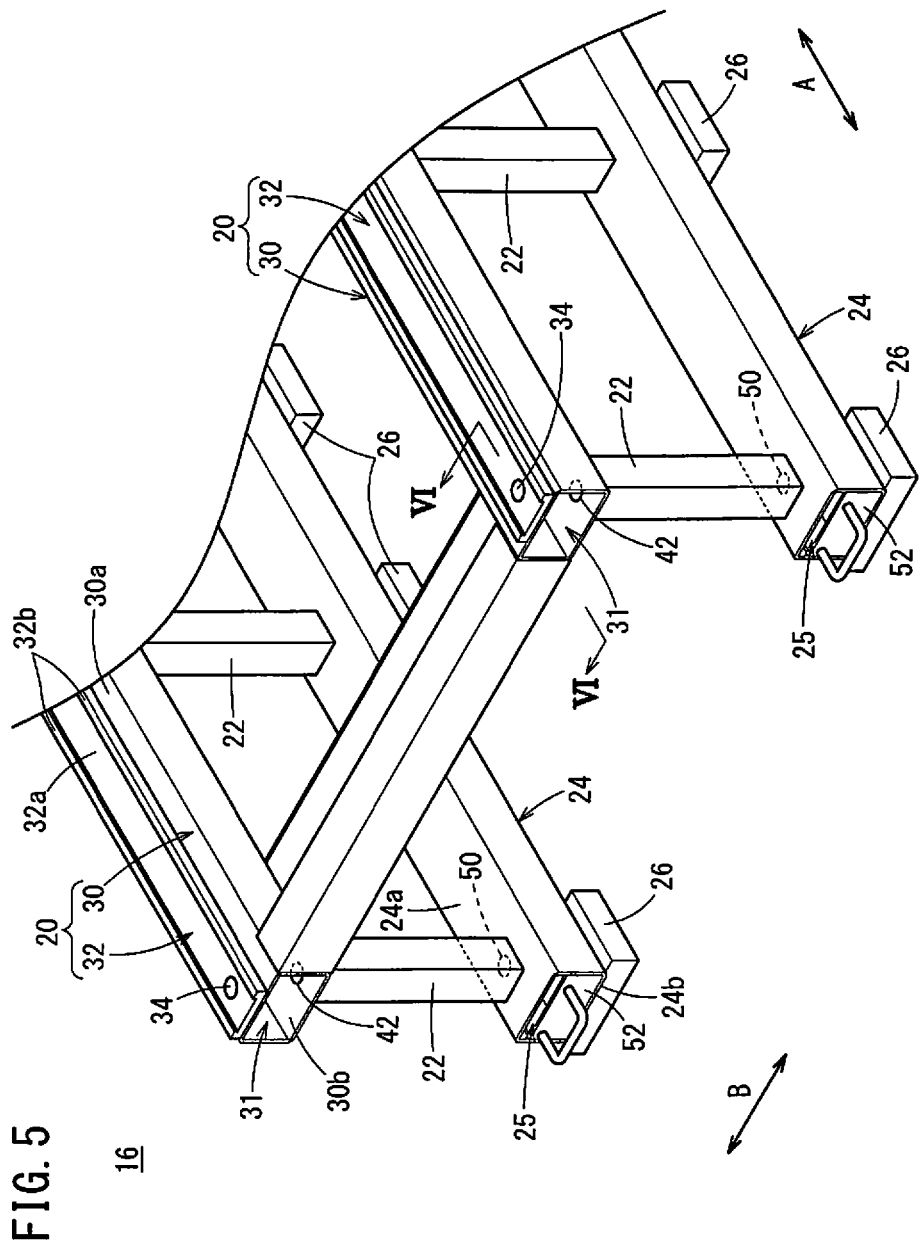
FIG. 5 is an enlarged view of main parts of a machine base in a third embodiment.
Figure 6:
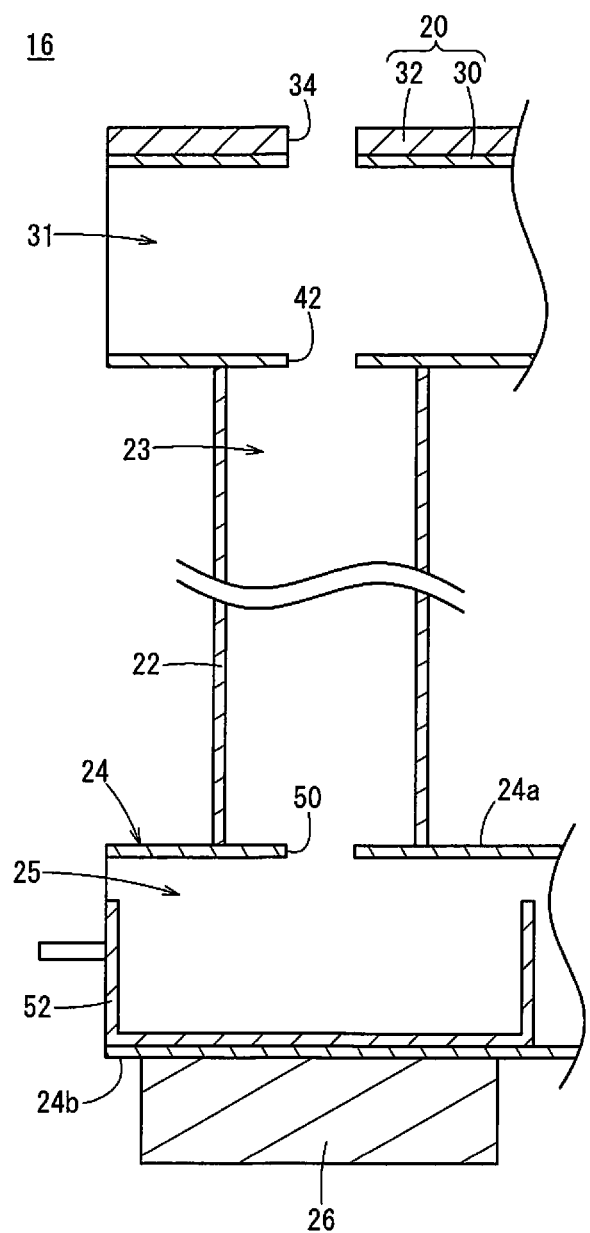
FIG. 6 is a sectional view taken along a line VI-VI in FIG. 5.

FIG. 5 is an enlarged view of main parts of a machine base 16 in the third embodiment, and FIG. 6 is a sectional view taken along a line VI-VI in FIG. 5. The same components as those in the second embodiment are allotted with the same reference numerals, and only different points will be described.

In the third embodiment, the upright 22 and the lower frame 24 are hollow, and the hollow upright 22 is arranged under (preferably directly below) the through hole 42. The through hole 42 is formed in the bottom wall 30b of the hollow member 30 so as to flow the oil having flowed through the through hole 34 to a hollow portion 23 of the upright 22. A through hole (third through hole) 50 for flowing the oil having flowed through the hollow portion 23 of the upright 22 into a hollow portion 25 of the lower frame 24 is formed on the upper wall, designated at 24a, of the lower frame 24.

Arranged in the hollow portion 25 of the lower frame 24 is an oil receptacle (third oil receptacle) 52 for receiving and collecting the oil having flowed through the through hole 50. The oil receptacle 52 is arranged under (preferably directly below) the through hole 50. Thus, the supplied oil can be collected in the oil receptacle 52. Further, by taking out the oil receptacle 52 from the hollow portion 25 of the lower frame 24, it is possible to easily dispose of the collected oil. Provision of the through hole 50 in the end portion of the lower frame 24 with respect to the direction A, the oil receptacle 52 can be easily taken out so that removal of oil can be simplified. In this way, it is possible with a simple structure to lead the oil having flowed to the upper frame 20 to the manageable place.

In the third embodiment, all the uprights 22 have the hollow portion 23, but only the uprights 22 through which the oil flows, that is, the uprights 22 provided under the through holes 34 may have the hollow portion 23. Also, the lower frame 24 has the hollow portion 25 in the whole region across the length of the lower frame 24, but the lower frame 24 may have the hollow portion 25 only in the portion where the through hole 50 is formed. At this time, when the hollow portion 25 is confined, an opening is formed in the lower frame 24 so that the hollow portion 25 can be accessed from the outside (so that the hollow portion 25 does not become a confined space).

Fourth Embodiment

Figure 7:
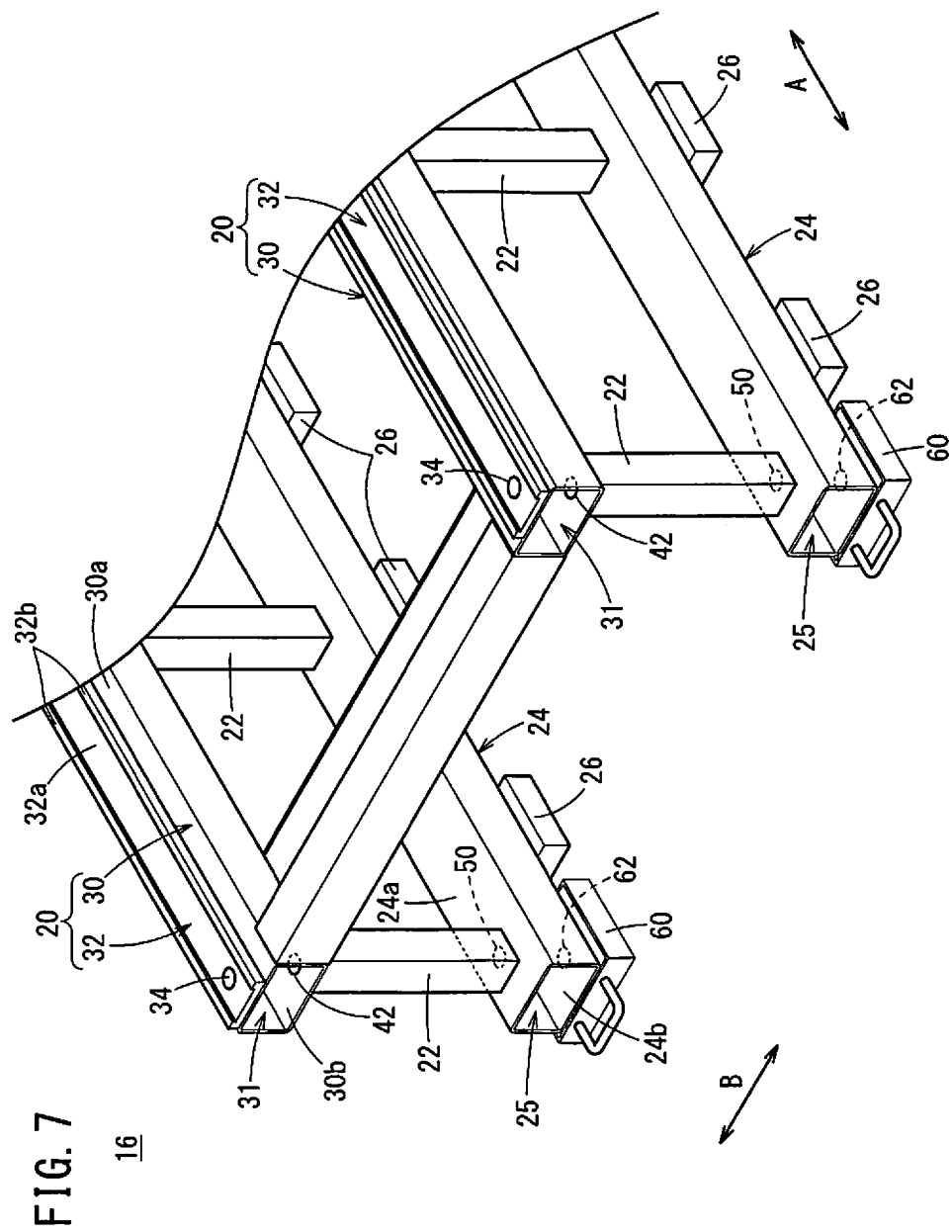
FIG. 7 is an enlarged view of main parts of a machine base in a fourth embodiment.

FIG. 7 is an enlarged view of main parts of a machine base 16 in the fourth embodiment. The same components as those of the third embodiment are allotted with the same reference numerals, and only different points will be described.

The fourth embodiment is different from the third embodiment in that an oil receptacle (fourth oil receptacle) 60 is provided under the lower frame 24, instead of arranging the oil receptacle 52 in the hollow portion 25 of the lower frame 24.

In the fourth embodiment, a through hole (fourth through hole) 62 is formed also in the bottom wall, designated at 24b, of the lower frame 24. The through hole 62 is preferably formed in the end of the lower frame 24 with respect to the direction A. Further, the through hole 62 is preferably formed under the through hole 50, and more preferably formed directly below the through hole 50.

Arranged under the lower frame 24 is an oil receptacle (fourth oil receptacle) 60 for receiving and collecting the oil having flowed through the through holes 50, 62. The oil receptacle 60 is provided below (preferably directly below) the through hole 62. As a result, the supplied oil can be stored in the oil receptacle 60. In this way, it is possible with a simple structure to lead the oil flowing to the upper frame 20 to a manageable place.

Here, a space is created between the installation surface of the injection molding machine 10 and the lower frame 24 by the support members 26, and the oil receptacle 60 is provided in the formed space.

Fifth Embodiment

Figure 8:
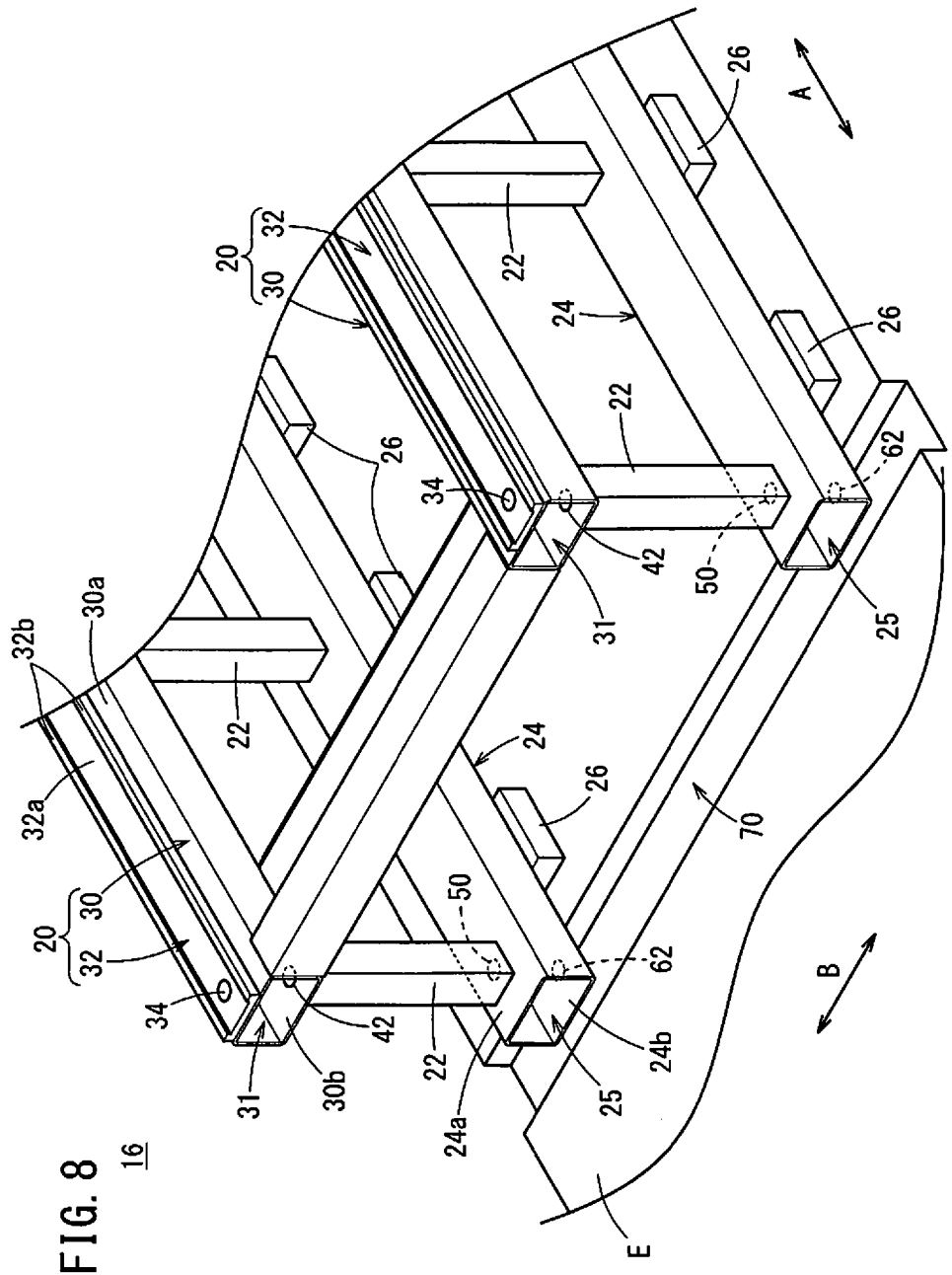
FIG. 8 is an enlarged view of main parts of a machine base in a fifth embodiment.

FIG. 8 is an enlarged view of main parts of a machine base 16 in the fifth embodiment. The same components as those in the fourth embodiment are allotted with the same reference numerals, and only different points will be described.

In the fifth embodiment, instead of providing the oil receptacle 60, the oil having flowed through the through hole 62 is drained to a flow passage 70 located under the lower frame 24. The through hole 62 is formed in the bottom wall 24b of the lower frame 24 so as to drain the oil having flowed into the hollow portion 25 of the lower frame 24 to the flow passage 70. Thus, the supplied oil can be led to the flow passage 70. In this way, it is possible with a simple structure to lead the oil having flowed to the upper frame 20 to the manageable place.

In FIG. 8, a groove serving as the flow passage 70 is formed on an installation surface E of the injection molding machine 10, but a pipe line (pipe) may be provided below the lower frame 24 as the flow passage 70.

Though, in the second embodiment, the oil receptacle 40 is arranged under the through hole 42, the flow passage 70 may be provided under the through hole 42, as in the fifth embodiment.

VARIATIONAL EXAMPLES

The above-described embodiments can also be modified as follows. It is also possible to combine the following variational examples.

Variational Example 1

In each of the above embodiments, the machine base 16 is configured to support both the clamping unit 12 and the injection unit 14. However, the machine base 16 may be configured to support at least one of the clamping unit 12 and the injection unit 14.

Variational Example 2

In each of the above embodiments, the multiple uprights 22 supporting the upper frame 20 from below are arranged in the machine base 16, but the upper frame 20 may be directly supported by the lower frame 24 without providing the uprights 22. In this case, in the third and following embodiments, the oil having flowed into the hollow portion 31 of the hollow member 30 passes through the through hole 50 immediately after passing through the through hole 42 and flows into the hollow portion 25 of the lower frame 24.

The present invention is not limited to the embodiments described above, and it goes without saying that the embodiments can be freely modified within a range that does not deviate from the essence and gist of the present invention as set forth in the appended claims.

[Technical Ideas Obtained from Embodiments]

Technical ideas that can be grasped from each of the above embodiments will be described below.

The machine base (16) supports at least one of the clamping unit (12) and the injection unit (14) of the injection molding machine (10) from below. The machine base (16) includes the upper frame (20) extended horizontally and configured to support at least one of the clamping unit (12) and the injection unit (14). The upper frame (20) has the hollow member (30) and the plate member (32) having a concave cross-section, attached to the upper surface of the hollow member (30). The plate member (32) and the hollow member (30) are formed with the first through hole (34) penetrating from the upper surface of the plate member (32) to the hollow portion (31) in the hollow member (30).

In this way, it is possible with a simple structure to lead the oil having flowed to the upper frame (20) to a manageable place, that is, to the hollow portion (31) of the hollow member (30). Further, provision of the plate member (32) having a concave cross-section in the upper frame (20) makes it possible to prevent the oil from dropping from the upper frame (20) so that it is possible to prevent the oil from dripping on the installation surface (E) on which the injection molding machine (10) is installed.

The first oil receptacle (36) may be arranged in the hollow portion (31) of the hollow member (30) and configured to receive and collect oil having flowed through the first through hole (34). Thereby, it is possible to collect supplied oil in the first oil receptacle (36), hence dispose of the collected oil easily.

The second through hole (42) may be formed in the bottom wall (30b) of the hollow member (30). Thereby, it is possible to lead the oil having flowed to the upper frame (20) to the manageable place with a simple structure.

The second oil receptacle (40) may be arranged under the hollow member (30) and configured to receive and collect the oil having flowed through the first through hole (34) and the second through hole (42). Thereby, it is possible to collect supplied oil in the second oil receptacle (40), hence dispose of the collected oil easily.

The machine base (16) may include the hollow upright (22) extended downward and configured to support the upper frame (20) from below and the hollow lower frame (24) extended horizontally below the upper frame (20) and configured to support the upright (22). The second through hole (42) may be formed in the bottom wall (30b) of the hollow member (30) so as to flow oil through the hollow portion (23) of the upright (22). The third through hole (50) may be formed in the upper wall (24a) of the lower frame (24) so as to flow the oil having flowed through the hollow portion (23) of the upright (22) to the hollow portion (25) of the lower frame (24). In this way, it is possible with a simple structure to lead the oil having flowed to the upper frame (20) to a manageable place, that is, to the hollow portion (25) of the lower frame (24).

The third oil receptacle (52) may be arranged in the hollow portion (25) of the lower frame (24) and configured to receive and collect the oil having flowed through the third through hole (50). Thereby, it is possible to collect supplied oil in the third oil receptacle (52), hence dispose of the collected oil easily.

The fourth through hole (62) may be formed in a bottom wall (24b) of the lower frame (24). Thereby, it is possible with a simple structure to lead the oil having flowed to the upper frame (20) to a manageable place.

The fourth oil receptacle (60) may be arranged under the lower frame (24) and configured to receive and collect the oil having flowed through the fourth through hole (62). Thereby, it is possible to collect supplied oil in the fourth oil receptacle (60), hence dispose of the collected oil easily.

What is claimed is:

1. A machine base for supporting at least one of a clamping unit and an injection unit of an injection molding machine, from below, comprising:
    an upper frame extending horizontally, wherein the upper frame is configured to support at least one of the clamping unit or the injection unit and has;
        a pair of longitudinally-extending, first and second hollow members; and
        first and second plate members each having a concave upper surface facing upward, the first and second plate members being parallel with and immovably attached to a respective upper surface of the first and second hollow members; and
    an upright supporting the first and second hollow members from below the first and second hollow members, and
    wherein the first plate member and the first hollow member are formed with a first through hole penetrating from the concave upper surface of the first plate member to a hollow portion in the first hollow member, and an opening in the concave upper surface of the first plate member is exposed to the environment, the second plate member and the second hollow member are formed with a second through hole penetrating from the concave upper surface of the second plate member to a hollow portion in the second hollow member, and an opening in the concave upper surface of the second plate member is exposed to the environment.

2. The machine base according to claim 1, further comprising a first oil receptacle arranged in the hollow portion of the first hollow member and configured to receive and collect oil having flowed through the first through hole from the opening in the concave upper surface of the first plate member.

3. The machine base according to claim 2, wherein the first through hole is disposed at an end of the first hollow member.

4. The machine base according to claim 3, wherein the first oil receptacle is a slidable draw removably received in a side opening defined in an end surface of the first hollow member.

5. The machine base according to claim 4, wherein the end surface of the first hollow member is perpendicular to the upper surface of the first hollow member.

6. The machine base according to claim 5, wherein the draw defines a cavity therein, the cavity of the draw being in vertical alignment with the first through hole.

7. The machine base according to claim 1, wherein the first plate member has a pair of raised parts protruding upward along opposite sides of the first plate member.

8. The machine base according to claim 7, wherein the concave upper surface of the first plate member is a solid surface along a length thereof, such that oil disposed on the concave upper surface of the first plate member is only flowable off of the concave upper surface of the first plate member via the first through hole.

9. The machine base according to claim 1, wherein the hollow portion of the first hollow member extends longitudinally through the first hollow member.

10. The machine base according to claim 1, wherein the first and second hollow members are parallel with one another and configured to support at least one of the clamping unit or the injection unit thereon.

11. The machine base according to claim 10, wherein at least a portion of the concave upper surface of each of the first and second plate members is exposed to the environment.

* * * * *